US012686405B2

(12) United States Patent
    Hirai

(10) Patent No.: US 12,686,405 B2
(45) Date of Patent: Jul. 21, 2026

(54) VEHICLE CONTROL SYSTEM

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventor: Masataka Hirai, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 61 days.

(21) Appl. No.: 18/608,253

(22) Filed: Mar. 18, 2024

(65) Prior Publication Data

US 2024/0336278 A1      Oct. 10, 2024

(30) Foreign Application Priority Data

Apr. 5, 2023    (JP) ................................. 2023-061383

(51) Int. Cl.
    *B60W 60/00*      (2020.01)
    *B60W 50/00*      (2006.01)
    *B60W 50/14*      (2020.01)
(52) U.S. Cl.
    CPC .......... *B60W 60/001* (2020.02); *B60W 50/14* (2013.01); *B60W 2050/0083* (2013.01);
    (Continued)

(58) Field of Classification Search
    CPC ......... B60W 2040/0809; B60W 40/09; B60W 2050/0063; B60W 2050/0066;
    (Continued)

(56) References Cited

U.S. PATENT DOCUMENTS 5,084,821 A * 1/1992 Ohsuga ............... F02D 41/2425
                                              701/101
2017/0297586 A1* 10/2017 Li ..................... B60W 50/0097
                    (Continued)

FOREIGN PATENT DOCUMENTS

JP      2015-125724 A      7/2015
JP      2018-022353 A      2/2018
                    (Continued)

*Primary Examiner* — Brandon Z Willis
(74) *Attorney, Agent, or Firm* — Posz Law Group, PLC

(57)          ABSTRACT

A vehicle control system mounted on a vehicle includes an automated driving system configured to execute automated driving. The vehicle control system includes at least one processor and at least one memory storing computer program code. The at least one memory and the computer program code are configured, with the at least one processor, to cause the vehicle control system to carry out adjusting and acquiring. The adjusting is adjusting a behavior of the vehicle during execution of the automated driving. The behavior includes at least one of a traveling position in a width direction in a traveling lane, a vehicle speed, or an acceleration. The acquiring is acquiring behavior request information related to a behavior request for the behavior from an occupant of the vehicle. The adjusting includes adjusting the behavior determined by the automated driving system based on the behavior request information.

10 Claims, 7 Drawing Sheets

(52) U.S. Cl.
CPC . *B60W 2050/146* (2013.01); *B60W 2540/215* (2020.02); *B60W 2556/40* (2020.02)

(58) Field of Classification Search
CPC . B60W 2050/0067; B60W 2050/0068; B60W 2050/0083; B60W 2050/0085; B60W 2050/146; B60W 50/085; B60W 50/087; B60W 50/10; B60W 50/14; B60W 60/001; B60W 60/0013; B60W 2520/10; B60W 2520/105; B60W 2540/043; B60W 2540/045; B60W 2540/215; B60W 2556/40; B60W 2554/801; B60W 2754/20; B60W 2720/10; B60W 2720/106; G05D 1/0212; G05D 1/0223; G05D 1/22; G05D 1/229; G05D 1/2297; G05D 1/65
See application file for complete search history.

(56) References Cited

U.S. PATENT DOCUMENTS

| | | | |
|---|---|---|---|
| 2017/0329330 A1* | 11/2017 | Hatano | B60W 60/0051 |
| 2018/0074497 A1* | 3/2018 | Tsuji | B60W 50/082 |
| 2019/0009794 A1 | 1/2019 | Toyoda et al. | |
| 2021/0094571 A1 | 4/2021 | Yu et al. | |
| 2022/0066438 A1* | 3/2022 | Higashi | G05D 1/646 |
| 2022/0111891 A1 | 4/2022 | Takeuchi et al. | |
| 2023/0286502 A1* | 9/2023 | Yun | B60W 60/001 |

FOREIGN PATENT DOCUMENTS

| | | | |
|---|---|---|---|
| JP | 2018-045397 A | 3/2018 |
| JP | 2020-054320 A | 4/2020 |
| JP | 2022-010965 A | 1/2022 |
| JP | 2022-148074 A | 10/2022 |

* cited by examiner

VEHICLE CONTROL SYSTEM

CROSS REFERENCE TO RELATED APPLICATION

The present application is based on Japanese Patent Application No. 2023-061383 filed on Apr. 5, 2023, the entire disclosure of which is incorporated herein by reference.

TECHNICAL FIELD

The present disclosure relates to a vehicle control system.

BACKGROUND

A conventional automated driving system uses a vehicle position estimated by inertial navigation to reduce an error in automated driving.

SUMMARY

According to at least one of embodiment, a vehicle control system mounted on a vehicle includes an automated driving system configured to execute automated driving. The vehicle control system includes at least one processor and at least one memory storing computer program code. The at least one memory and the computer program code are configured, with the at least one processor, to cause the vehicle control system to carry out adjusting and acquiring. The adjusting is adjusting a behavior of the vehicle during execution of the automated driving. The behavior includes at least one of a traveling position in a width direction in a traveling lane, a vehicle speed, or an acceleration. The acquiring is acquiring behavior request information related to a behavior request for the behavior from an occupant of the vehicle. The adjusting includes adjusting the behavior determined by the automated driving system based on the behavior request information acquired by the information acquirer.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

To begin with, examples of relevant techniques will be described.

Various techniques have been proposed for the automated driving of a vehicle. For example, an automated driving system according to a comparative example reduces an error in automated driving using a vehicle position estimated by inertial navigation.

However, a travel path planned by the automated driving system may deviate from a travel path that an occupant will pass during manual driving. More specifically, the automated driving system may control the vehicle to travel on a center of a lane even though the occupant who prefers to travel on a position farther away from an oncoming vehicle wants to travel on an edge of the lane as much as possible. In such a case, the occupant may feel uneasy about the automated driving of the automated driving system. In addition, speed and acceleration determined by the automated driving system are also different from speed and acceleration assumed during manual driving by the occupant, which may cause anxiety to the occupant. In contrast to the comparative example, according to a vehicle control system of the present disclosure, a behavior or an operation of a vehicle that makes an occupant feel uneasy during automated driving can be reduced.

According to one aspect of the present disclosure, a vehicle control system mounted on a vehicle includes an automated driving system configured to execute automated driving. The vehicle control system includes at least one processor and at least one memory storing computer program code. The at least one memory and the computer program code are configured, with the at least one processor, to cause the vehicle control system to carry out adjusting and acquiring. The adjusting is adjusting a behavior of the vehicle during execution of the automated driving. The behavior includes at least one of a traveling position in a width direction in a traveling lane, a vehicle speed, or an acceleration. The acquiring is acquiring behavior request information related to a behavior request for the behavior from an occupant of the vehicle. The adjusting includes adjusting the behavior determined by the automated driving system based on the behavior request information.

According to this configuration, the behavior request information is acquired, and the behavior determined by the automated driving system is adjusted. Therefore, the behavior determined by the automated driving system can be adjusted according to the request of the occupant. Therefore, the behavior of the vehicle that makes the occupant feel uncomfortable can be reduced even if the behavior determined in advance by the automated driving system makes the occupant feel uncomfortable.

First Embodiment

<Configuration of Vehicle Control System 100>

Figure 1:
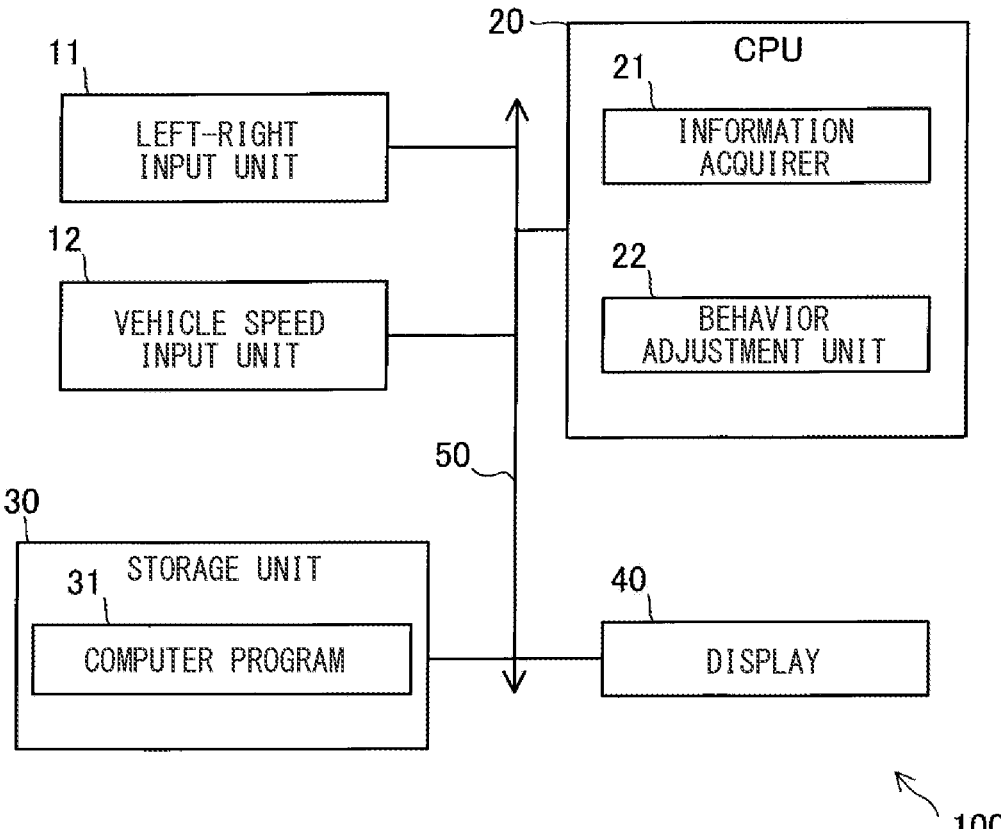
FIG. 1 is a block diagram illustrating a vehicle control system according to a first embodiment of the present disclosure.

A vehicle control system 100 shown in FIG. 1 is mounted on a vehicle in which automated driving is executed by an automated driving system. The automated driving system controls a driving device, a braking device, a steering device, and the like so as to realize a predetermined behavior of the vehicle in order to automatically move the vehicle to a destination. In the present embodiment, the "behavior of the vehicle" includes a traveling position of the vehicle in a width direction in a lane, speed of the vehicle, and acceleration of the vehicle. The vehicle control system 100 of the present embodiment adjusts the behavior of the vehicle determined in advance by the automated driving system in response to a request from an occupant of the vehicle. The vehicle control system 100 includes a left-right input unit 11, a vehicle speed input unit 12, a central processing device (i.e., CPU) 20, a storage unit 30, and a display 40. The left-right input unit 11, the vehicle speed input unit 12, the CPU 20, the storage unit 30, and the display 40 are electrically connected to each other by an internal bus 50.

The left-right input unit 11 receives an input of a request value of a left-right adjustment amount that is an adjustment amount of a traveling position in the width direction of the vehicle from an occupant of the vehicle. The left-right input unit 11 is, for example, a button provided in a vehicle compartment. The vehicle traveling by the automated driving moves to a target point in accordance with a travel path planned by the automated driving system. At this time, the traveling position of the vehicle in the width direction in the lane is determined in advance by the automated driving system, for example, a center in the lane. Hereinafter, the traveling position determined in advance by the automated driving system is referred to as a "specified traveling position". The occupant of the vehicle can adjust the traveling position of the vehicle in the width direction by inputting the request value of the left-right adjustment amount to the left-right input unit 11. The request value of the left-right adjustment amount is input as, for example, a distance in a left-right direction with respect to the specified traveling position. Such a request value of the left-right adjustment amount is, for example, 30 cm to a left of the specified traveling position. The request value of the left-right adjustment amount may be input as a ratio to a total width of the lane. Such a request value of the left-right adjustment amount is, for example, 5% to a left of the specified traveling position.

The vehicle speed input unit 12 receives an input of a request value of a vehicle speed adjustment amount, which is an adjustment amount of at least one of speed and acceleration of the vehicle, from the occupant of the vehicle. Similarly to the left-right input unit 11, the vehicle speed input unit 12 is, for example, a button provided in the vehicle compartment. The speed and acceleration of the vehicle traveling by the automated driving system are determined in advance by the automated driving system. Hereinafter, the speed determined in advance by the automated driving system is referred to as a "specified speed", and the acceleration determined in advance by the automated driving system is referred to as a "specified acceleration". The occupant of the vehicle can adjust at least one of the speed and the acceleration of the vehicle by inputting the request value of the vehicle speed adjustment amount to the vehicle speed input unit 12. The request value of the vehicle speed adjustment amount is input as, for example, an increase amount or a decrease amount of the speed with respect to the specified speed. Such a request value of the vehicle speed adjustment amount is, for example, −5 km per hour faster than the specified speed. The request value of the vehicle speed adjustment amount may be input as a ratio of the speed to the specified speed. Such a request value of the vehicle speed adjustment amount is, for example, −5% of the specified speed. The request value of the vehicle speed adjustment amount may be input as, for example, an increase amount or a decrease amount of the acceleration with respect to the specified acceleration, or may be input as a ratio of the acceleration with respect to the specified acceleration.

The CPU 20 functions as an information acquirer 21 and a behavior adjustment unit 22 by executing a computer program 31 stored in the storage unit 30.

The information acquirer 21 acquires behavior request information. In the present embodiment, the "behavior request information" is information related to a request by the occupant for behavior of the vehicle. The behavior request information includes the request value of the left-right adjustment amount and the request value of the vehicle speed adjustment amount described above. The information acquirer 21 acquires at least one of the request value of the left-right adjustment amount and the request value of the vehicle speed adjustment amount.

The behavior adjustment unit 22 adjusts the behavior determined in advance by the automated driving system according to the behavior request information acquired by the information acquirer 21. More specifically, for example, the behavior adjustment unit 22 adjusts the traveling position of the vehicle in the width direction when the occupant inputs the request value of the left-right adjustment amount to the left-right input unit 11 and the information acquirer 21 acquires the request value of the left-right adjustment amount. More specifically, the behavior adjustment unit 22 realizes the adjustment of the traveling position of the vehicle by transmitting information to a steering device or the automated driving system of the vehicle. In addition, for example, the behavior adjustment unit 22 adjusts the traveling position of the vehicle in the width direction when the occupant inputs the request value of the vehicle speed adjustment amount to the vehicle speed input unit 12 and the information acquirer 21 acquires the request value of the vehicle speed adjustment amount. More specifically, the behavior adjustment unit 22 realizes the adjustment of at least one of the speed and the acceleration of the vehicle by transmitting information to the driving device and the braking device of the vehicle or the automated driving system.

The storage unit 30 includes a storage device such as a hard disc drive (i.e., HDD), a solid state drive (i.e., SSD), a read only memory (i.e., ROM), or a random access memory (i.e., RAM). The storage unit 30 stores the above-described computer program 31 and various types of information for causing each unit of the vehicle control system 100 to function.

The display 40 displays at least one of the request value of the left-right adjustment amount and the request value of the vehicle speed adjustment amount acquired by the information acquirer 21. The display 40 is, for example, a liquid crystal monitor or the like provided in the vehicle compartment. The occupant visually checks the information displayed on the display 40, and the occupant can check at least one of the request value of the left-right adjustment amount and the request value of the vehicle speed adjustment amount acquired by the information acquirer 21.

Figure 2:
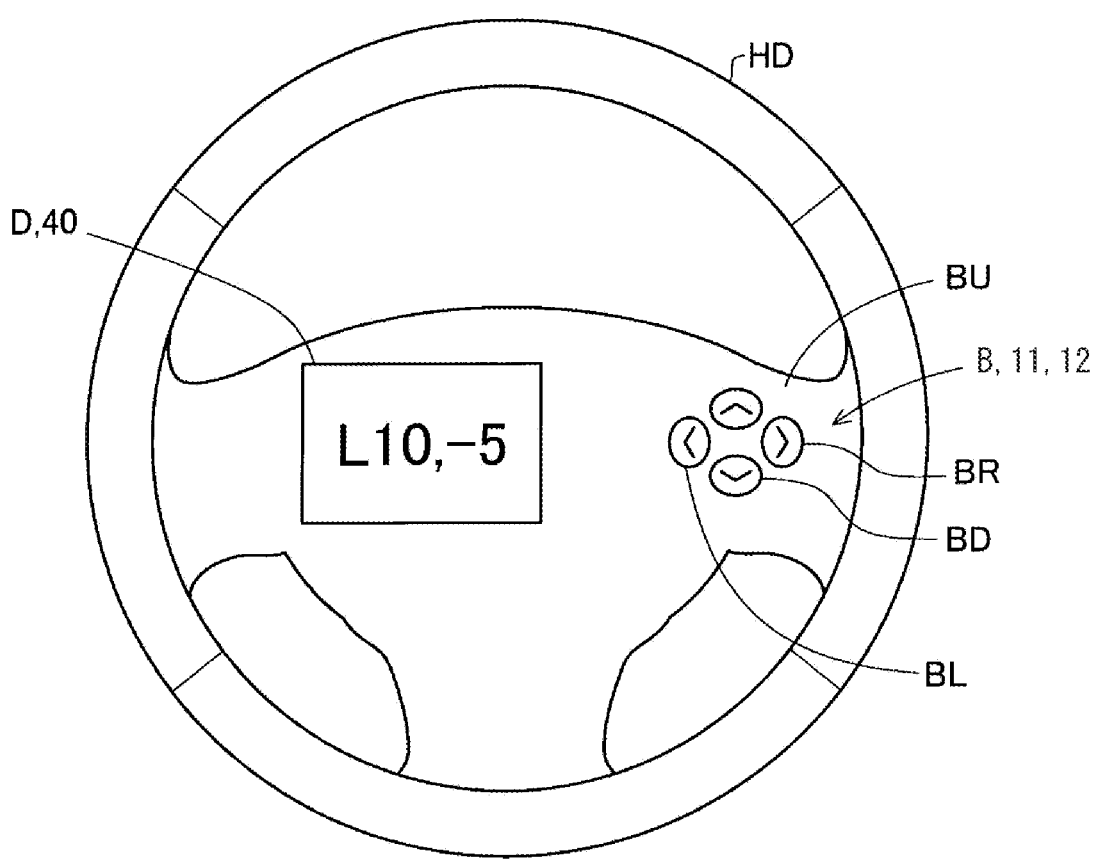
FIG. 2 is an explanatory diagram illustrating an example of a left-right input unit, a vehicle speed input unit, and a display.

In the example shown in FIG. 2, a steering wheel HD of the vehicle is provided with the left-right input unit 11, the vehicle speed input unit 12, and the display 40. More specifically, the left-right input unit 11 and the vehicle speed input unit 12 are configured by a button unit B provided on the steering wheel HD. The button unit B includes four buttons in total: a left button BL, a right button BR, an acceleration button BU, and a deceleration button BD. The left button BL and the right button BR correspond to the left-right input unit 11, and the acceleration button BU and the deceleration button BD correspond to the vehicle speed input unit 12. The occupant of the vehicle can input the request value of the left-right adjustment amount and the request value of the vehicle speed adjustment amount by operating the button unit B. The display 40 may display the request value of the acceleration adjustment amount instead of the request value of the vehicle speed adjustment amount or in addition to the request value of the vehicle speed adjustment amount.

In the example shown in FIG. 2, the display 40 is a liquid crystal display D provided on the steering wheel HD. The "L10, −5." shown on the liquid crystal display D indicates the request value of the left-right adjustment amount and the request value of the vehicle speed adjustment amount, respectively. More specifically, "L10" indicates the request value of the left-right adjustment amount, and indicates that the request value of the left-right adjustment amount of 10 cm on the left with respect to the specified traveling position is input by the occupant. "−5" indicates the request value of the vehicle speed adjustment amount, and indicates that the request value of the vehicle speed adjustment amount of −5 km/h with respect to the specified speed is input by the occupant.

Next, an example of left right adjustment by the behavior adjustment unit 22 is described.

Figure 3:
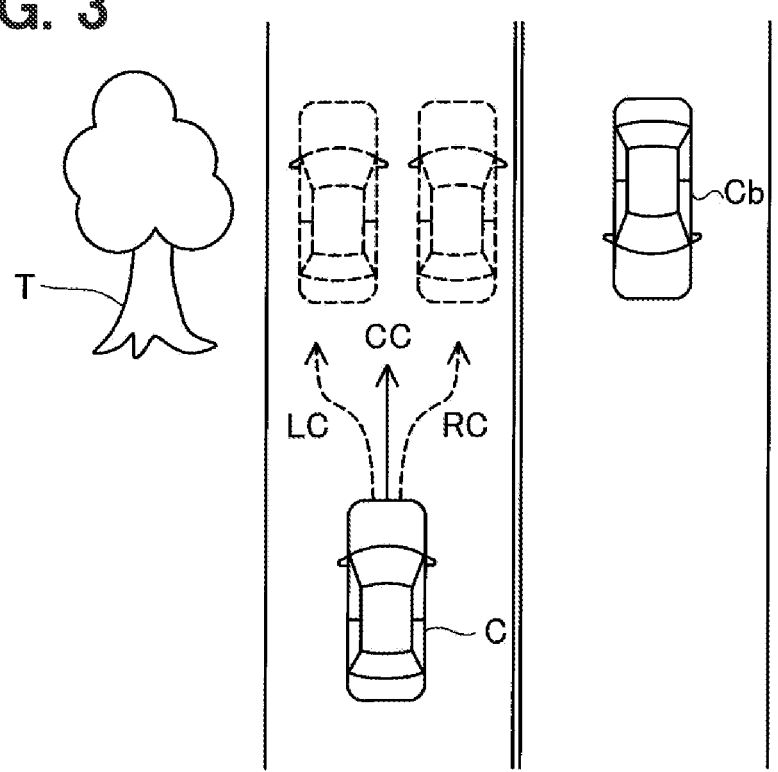
FIG. 3 is an explanatory diagram schematically illustrating an example of traveling position adjustment by a behavior adjustment unit.

In an example shown in FIG. 3, the vehicle C that performs the automated driving by the automated driving system is traveling near the center of the lane as the specified traveling position, and is traveling along a direction indicated by an arrow CC. At this time, the occupant inputs the request value of the left-right adjustment amount, for example 30 cm to the left, to the left-right input unit 11, and the behavior adjustment unit 22 adjusts the traveling position of the vehicle C, when the occupant wants to travel at a position further away from an oncoming vehicle Cb. Therefore, the vehicle C is capable of traveling at a position further away from the oncoming vehicle Cb in the width direction as indicated by an arrow LC.

In addition, the occupant inputs the request value of the left-right adjustment amount, for example 30 cm to the right, to the left-right input unit 11 and the behavior adjustment unit 22 adjusts the traveling position of the vehicle C when an obstacle such as a tree T is present on a road side and the occupant wants to travel away from the obstacle, Therefore, the vehicle C is capable of travelling at a position farther from the tree T in the width direction as indicated by an arrow RC.

Figure 4:
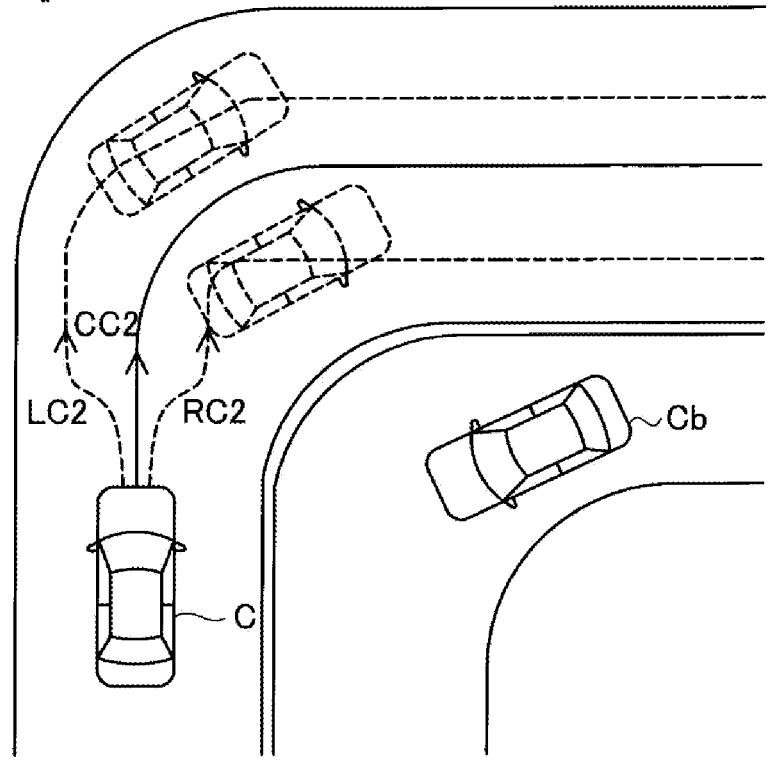
FIG. 4 is an explanatory diagram schematically illustrating another example of traveling position adjustment by the behavior adjustment unit.

In an example shown in FIG. 4, the vehicle C that performs the automated driving by the automated driving system is traveling near the center of the lane as the specified traveling position, and is going to turn a curve along a direction indicated by an arrow CC2. At this time, the occupant inputs the request value of the left-right adjustment amount, for example 30 cm to the left, to the left-right input unit 11, and the behavior adjustment unit 22 adjusts the traveling position of the vehicle C, when the occupant wants to turn a curve with a larger radius or wants to travel at a position farther from the oncoming vehicle Cb. Therefore, the vehicle C is capable of traveling at a position further outside in the lane as indicated by an arrow LC2. That is, the vehicle C is capable of turning the curve with the larger radius.

In addition, the occupant inputs the request value of the left-right adjustment amount, for example 30 cm to the right, to the left-right input unit 11, and the behavior adjustment unit 22 adjusts the traveling position of the vehicle C, when the occupant wants to turn a curve with a smaller radius or wants to travel away from a road shoulder. Therefore, the vehicle C is capable of traveling at a position further outside in the lane as indicated by an arrow RC2. That is, the vehicle C is capable of turning a curve with the smaller radius.

FIG. 4 shows an example in which the traveling position is adjusted before entering a curve, but the present disclosure is not limited thereto. The traveling position may be adjusted during travel on a curve.

Next, an example of vehicle speed adjustment by the behavior adjustment unit 22 is described.

Figure 5:
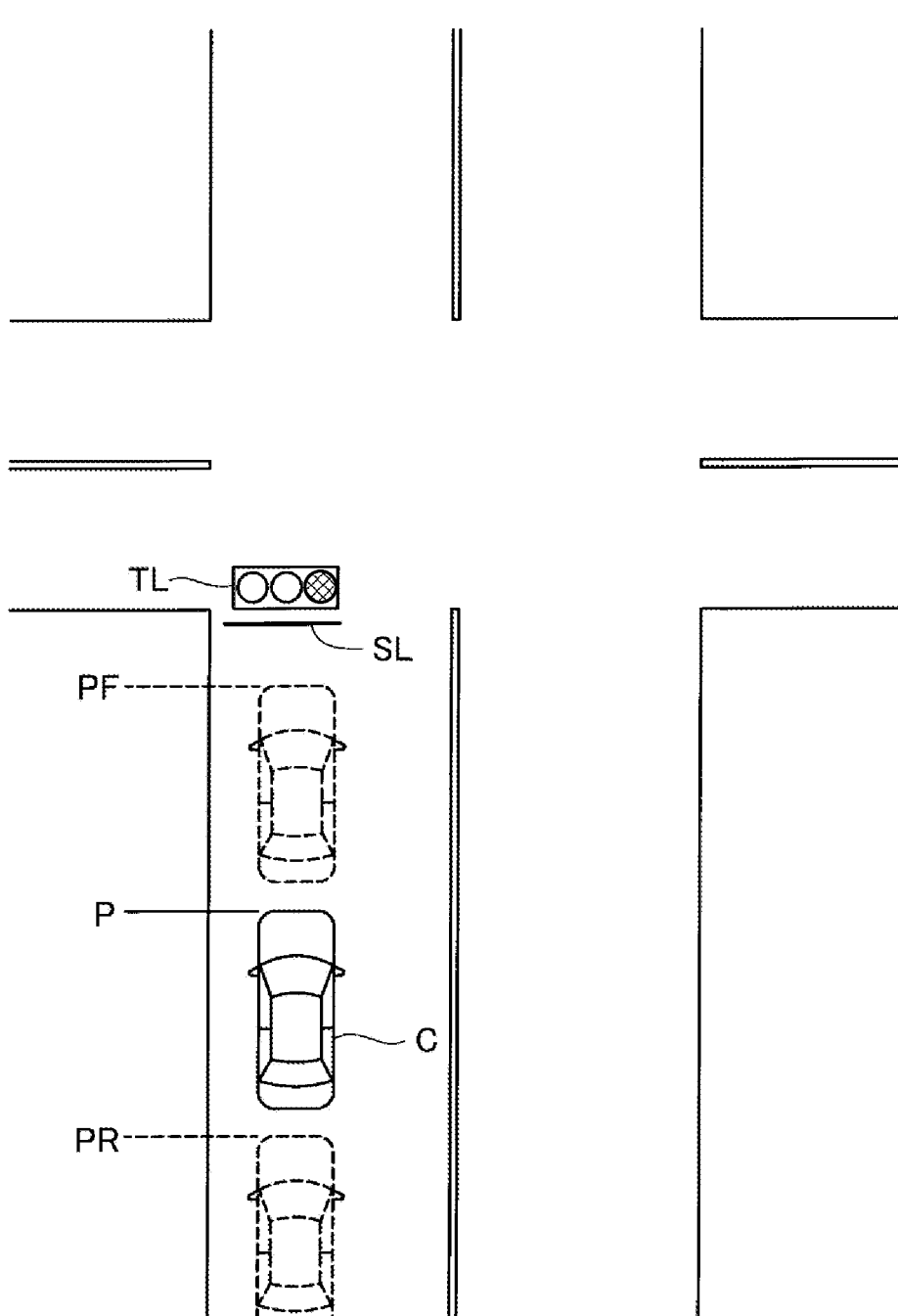
FIG. 5 is an explanatory diagram schematically illustrating an example of vehicle speed adjustment by the behavior adjustment unit.

In an example shown in FIG. 5, the vehicle C that executes the automated driving by the automated driving system decelerates at the specified acceleration and stops at a stop line SL when a signal of a traffic signal TL is red. More specifically, the vehicle C starts deceleration from a position P when the vehicle C decelerates and stops at the specified acceleration. At this time, the occupant inputs the request value of the vehicle speed adjustment amount to the vehicle speed input unit 12, and the behavior adjustment unit 22 adjusts the acceleration of the vehicle C when the occupant wants to stop more gently, that is, the occupant wants to decelerate by an acceleration smaller than the specified acceleration. Therefore, the vehicle C starts deceleration from a position PR close to the vehicle C with respect to the position P in a travel direction. As a result, the vehicle C is capable of decelerating at an acceleration smaller than the specified acceleration and stop at the stop line SL.

On the other hand, the occupant inputs the request value of the vehicle speed adjustment amount to the vehicle speed input unit 12, and the behavior adjustment unit 22 adjusts the acceleration of the vehicle C when the occupant wants to stop more quickly, that is, the occupant wants to decelerate by an acceleration greater than the specified acceleration. Therefore, the vehicle C starts deceleration from a position PF away from the vehicle C with respect to the position P in a travel direction. As a result, the vehicle C is capable of decelerating at an acceleration greater than the specified acceleration and stop at the stop line SL.

According to the vehicle control system 100 of the first embodiment described above, the information acquirer 21 acquires the behavior request information, and the behavior adjustment unit 22 adjusts the behavior determined in advance by the automated driving system according to the acquired behavior request information. Therefore, the behavior determined in advance by the automated driving system can be adjusted according to the request of the occupant. Therefore, the behavior of the vehicle that makes the occupant feel uncomfortable can be reduced even if the behavior determined in advance by the automated driving system makes the occupant feel uncomfortable.

Since the left-right input unit 11 and the vehicle speed input unit 12 are provided, the occupant can input the left-right adjustment amount and the vehicle speed adjustment amount via the left-right input unit 11 and the vehicle speed input unit 12.

Second Embodiment

Figure 6:
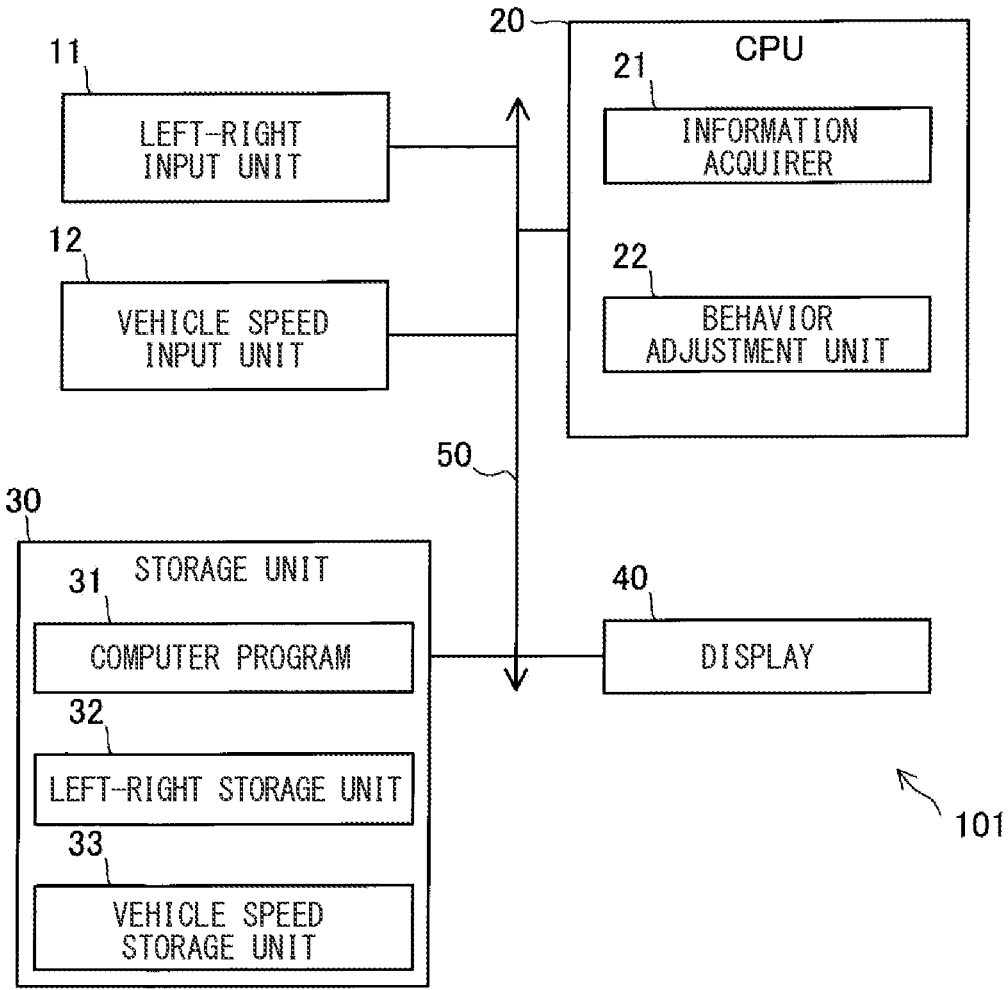
FIG. 6 is a block diagram illustrating a vehicle control system according to a second embodiment.

A vehicle control system 101 of the second embodiment shown in FIG. 6 is different from the vehicle control system 100 of the first embodiment in that a storage unit 30 further includes a left-right storage unit 32 and a vehicle speed storage unit 33. A function of an information acquirer 21 is also different. Since the other configurations of the vehicle control system 101 of the second embodiment are the same as those of the vehicle control system 100 of the first embodiment, the same elements are designated by the same reference signs, and detailed description thereof will be omitted.

The left-right storage unit 32 stores a request value of the left-right adjustment amount input from the left-right input unit 11. The vehicle speed storage unit 33 stores a request value of the vehicle speed adjustment amount input from the vehicle speed input unit 12. The information acquirer 21 acquires at least one of the request value of the left-right adjustment amount stored in the left-right storage unit 32 and the request value of the vehicle speed adjustment amount stored in the vehicle speed storage unit 33. The behavior adjustment unit 22 adjusts the behavior of the vehicle in accordance with at least one of the request value of the left-right adjustment amount and the request value of the vehicle speed adjustment amount acquired by the information acquirer 21.

According to the vehicle control system 101 of the second embodiment described above, since the left-right storage unit 32 and the vehicle speed storage unit 33 are further provided, the request value of the left-right adjustment amount and the request value of the vehicle speed adjustment amount can be stored. As a result, a time and effort for the occupant to re-input the request value of the left-right adjustment amount and the request value of the vehicle speed adjustment amount can be reduced.

Third Embodiment

Figure 7:
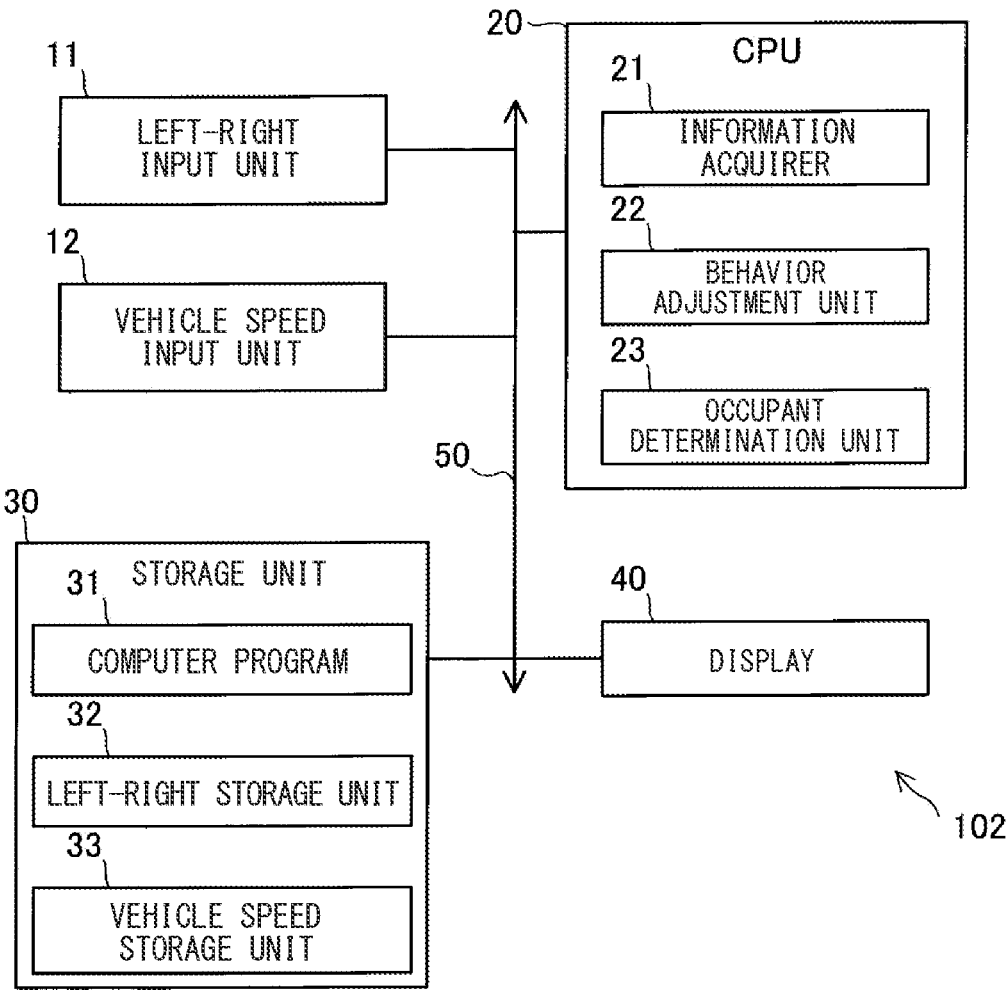
FIG. 7 is a block diagram illustrating a vehicle control system according to a third embodiment.

A vehicle control system 102 of a third embodiment shown in FIG. 7 is different from the vehicle control system 101 of the second embodiment in that a CPU 20 further functions as an occupant determination unit 23. Functions of a left-right storage unit 32, a vehicle speed storage unit 33, and an information acquirer 21 are also different. Since the other configurations of the vehicle control system 102 of the third embodiment are the same as those of the vehicle control system 101 of the second embodiment, the same elements are designated by the same reference signs, and detailed description thereof will be omitted.

The occupant determination unit 23 determines an occupant in the vehicle. This determination is performed using, for example, a camera that is provided in the vehicle and captures an image of the occupant. The determination of the occupant is not limited to the camera, and may be performed in any form such as fingerprint authentication or input of an ID (i.e., identification) and a password.

The left-right storage unit 32 stores the occupant determined by the occupant determination unit 23 and the request value of the left-right adjustment amount in association with each other. The vehicle speed storage unit 33 stores the occupant determined by the occupant determination unit 23 and the request value of the vehicle speed adjustment amount in association with each other. The left-right storage unit 32 and the vehicle speed storage unit 33 is capable of storing the request values of the left-right adjustment amounts and the request values of the vehicle speed adjustment amounts of a plurality of occupants.

The information acquirer 21 acquires at least one of the request value of the left-right adjustment amount associated with the occupant determined by the occupant determination unit 23 among the request values of the left-right adjustment amount stored by the left-right storage unit 32 and the request value of the vehicle speed adjustment amount associated with the occupant determined by the occupant determination unit 23 among the request values of the vehicle speed adjustment amount stored by the vehicle speed storage unit 33.

According to the vehicle control system 102 of the third embodiment described above, the occupant determination unit 23 that determines the occupant is provided, the left-right storage unit 32 stores the request value of the left-right adjustment amount in association with the occupant, and the vehicle speed storage unit 33 stores the request value of the vehicle speed adjustment amount in association with the occupant. Therefore, the request value of the left-right adjustment amount and the request value of the vehicle speed adjustment amount can be stored for each occupant. Since the information acquirer 21 acquires at least one of the request value of the left-right adjustment amount and the request value of the vehicle speed adjustment amount associated with the occupant determined by the occupant determination unit 23, the request value of the left-right adjustment amount and the request value of the vehicle speed adjustment amount stored for each occupant can be used for the adjustment of the behavior of the vehicle.

Fourth Embodiment

A vehicle control system according to the fourth embodiment is different from the vehicle control system 101 according to the second embodiment in functions of a left-right storage unit 32 and a vehicle speed storage unit 33. Other configurations of the vehicle control system of the fourth embodiment are the same as those of the vehicle control system 101 of the second embodiment, and thus detailed description thereof will be omitted.

The left-right storage unit 32 of the fourth embodiment stores map data used for the automated driving by the automated driving system and a request value of the left-right adjustment amount at each point in the map data in association with each other. As a result, in a place where the occupant has input the request value of the left-right adjustment amount, the occupant can save the time and effort of inputting the request value of the left-right adjustment amount again by using the request value of the left-right adjustment amount stored in association with the map data.

Similarly to the left-right storage unit 32, the vehicle speed storage unit 33 of the fourth embodiment stores the map data used for the automated driving by the automated driving system and the request value of the vehicle speed adjustment amount at each point in the map data in association with each other. As a result, in a place where the occupant has input the request value of the vehicle speed adjustment amount, the occupant can save the time and effort of inputting the request value of the vehicle speed adjustment amount again by using the request value of the vehicle speed adjustment amount stored in association with the map data.

According to the vehicle control system of the fourth embodiment described above, the left-right storage unit 32 stores the map data used for the automated driving by the automated driving system and the request value of the left-right adjustment amount at each point in the map data in association with each other, and the vehicle speed storage unit 33 stores the map data and the request value of the vehicle speed adjustment amount at each point in the map data in association with each other. This saves the occupant from having to input the request value of the left-right adjustment amount or the request value of the vehicle speed adjustment amount again at locations where the occupant has previously input the request value of the left-right adjustment amount or the request value of the vehicle speed adjustment amount.

The vehicle control system of the fourth embodiment may be used in combination with the vehicle control system 102 of the third embodiment. More specifically, the left-right storage unit 32 may store the map data, the request value of the left-right adjustment amount at each point in the map data, and the occupant in association with each other. The vehicle speed storage unit 33 may store the map data, the request value of the vehicle speed adjustment amount at each point in the map data, and the occupant in association with each other.

Fifth Embodiment

Figure 8:
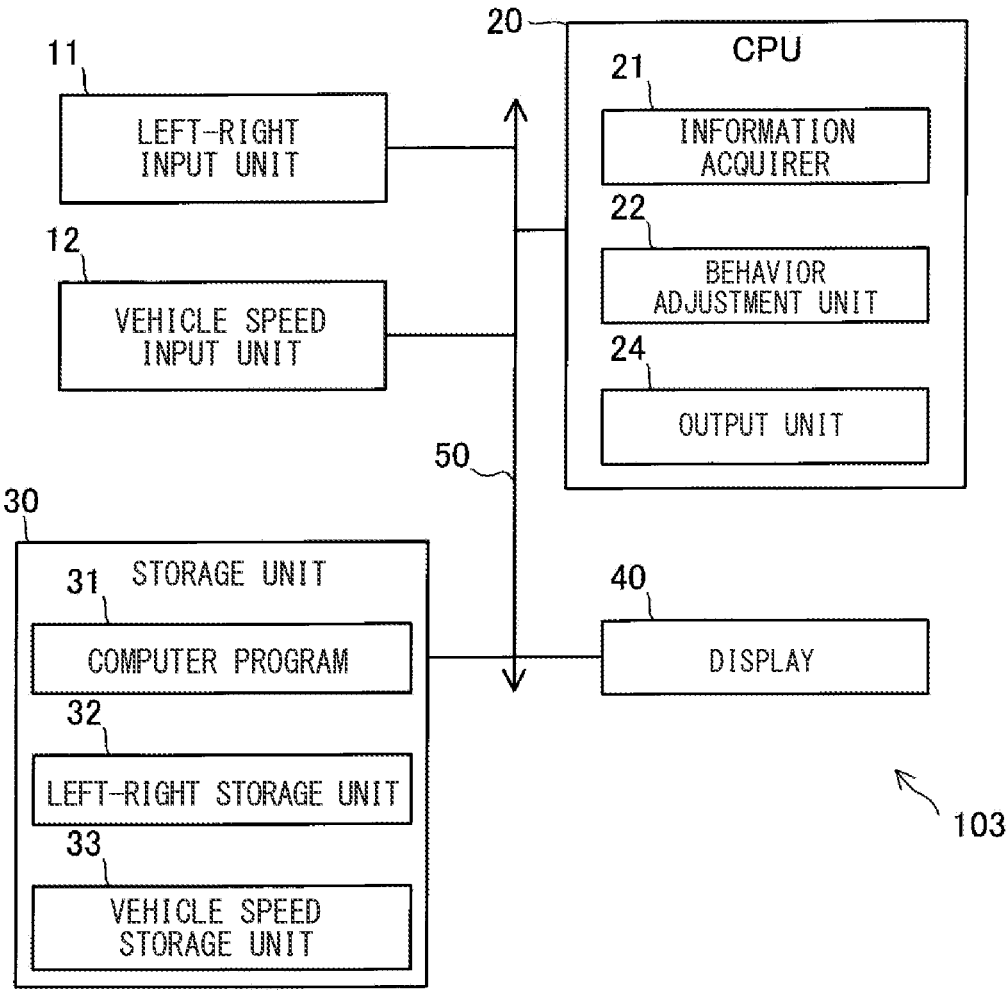
FIG. 8 is a block diagram illustrating a vehicle control system according to a fifth embodiment.

A vehicle control system 103 of a fifth embodiment shown in FIG. 8 is different from the vehicle control system 101 of the second embodiment in that it further includes an output unit 24. Functions of a left-right storage unit 32, a vehicle speed storage unit 33, and an information acquirer 21 are also different. Since the other configurations of the vehicle control system 103 of the fifth embodiment are the same as those of the vehicle control system 101 of the second embodiment, the same elements are designated by the same reference signs, and detailed description thereof will be omitted.

The output unit 24 outputs a reference left-right adjustment amount and a reference vehicle speed adjustment amount. The reference left-right adjustment amount is a value serving as a reference of a request value of the left-right adjustment amount. The reference vehicle speed adjustment amount is a value serving as a reference of a request value of the vehicle speed adjustment amount. The reference left-right adjustment amount and the reference vehicle speed adjustment amount are output from the behavior of the vehicle in manual driving of the vehicle. More specifically, the reference left-right adjustment amount is output based on a difference between a traveling position in the width direction during the manual driving by the occupant and a traveling position, which is the "specified traveling position", in the width direction during the automated driving by the automated driving system. The output unit 24 compares the traveling position during the manual driving with the specified traveling position, and outputs "30 cm to the left" as the reference left-right adjustment amount when the traveling position during the manual driving is shifted to the left by 30 cm from the specified traveling position, for example. The left-right storage unit 32 stores the reference left-right adjustment amount. The reference left-right adjustment amount may be stored in association with each point in the map data used for the automated driving. The reference left-right adjustment amount may be output as an average value of the difference between the traveling position during the manual driving and the specified traveling position. By using such an average value, the reference left-right adjustment amount can be output even in a place where the manual driving has not been performed.

The reference vehicle speed adjustment amount is output from a difference between at least one of a vehicle speed and an acceleration during the manual driving by the occupant and at least one of a speed, which is the "specified speed", and an acceleration, which is the "specified acceleration", during the automated driving by the automated driving system. The output unit 24 compares at least one of the speed and the acceleration during the manual driving with at least one of the specified speed and the specified acceleration, and outputs "−5 km per hour" as the reference vehicle speed adjustment amount, for example, when the vehicle speed during the manual driving is lower than the specified speed by 5 km per hour. The vehicle speed storage unit 33 stores the reference vehicle speed adjustment amount. The reference vehicle speed adjustment amount may be stored in association with each point in the map data used for the automated driving. The reference vehicle speed adjustment amount may be output as an average value of the difference between at least one of the vehicle speed and the acceleration during the manual driving and at least one of the specified speed and the specified acceleration. By using such the average value, the reference vehicle speed adjustment amount can be output even in a place where the manual driving has not been performed.

The information acquirer 21 of the fifth embodiment acquires at least one of the reference left-right adjustment amount and the reference vehicle speed adjustment amount as the behavior request information. The behavior adjustment unit 22 adjusts the behavior of the vehicle in accordance with the acquired reference left-right adjustment amount and reference vehicle speed adjustment amount.

According to the vehicle control system 103 of the fifth embodiment described above, the output unit 24 that outputs the left-right adjustment amount serving as a reference of the request value of the left-right adjustment amount using the difference between the traveling position in the width direction in the manual driving of the vehicle by the occupant and the traveling position in the width direction in the automated driving by the automated driving system. Further, the output unit 24 outputs the reference vehicle speed adjustment amount serving as a reference of the vehicle speed adjustment amount using the difference between at least one of the vehicle speed and the acceleration in the manual driving and at least one of the vehicle speed and the acceleration in the automated driving. Therefore, the difference between the behavior of the vehicle in the manual driving and the automated driving can be reduced. As a result, the uneasiness of the occupant during the automated driving can be reduced.

The vehicle control system 103 of the fifth embodiment may be used in combination with the vehicle control system of the third embodiment. More specifically, the left-right storage unit 32 may store the reference left-right adjustment amount and the occupant in association with each other. The vehicle speed storage unit 33 may store the reference vehicle speed adjustment amount and the occupant in association with each other.

Other Embodiments

In the first embodiment, an example in which a position in the width direction is adjusted and an example in which the acceleration is adjusted in the behavior of the vehicle by the vehicle control system 100 have been described, but the present disclosure is not limited thereto. The vehicle control system 100 may simultaneously adjust any two or more of the position in the width direction, the vehicle speed, and the acceleration.

In the first embodiment, the example in which the left-right input unit 11 and the vehicle speed input unit 12 are buttons provided on the steering wheel HD has been described, but the present disclosure is not limited thereto. The left-right input unit 11 may be the steering wheel HD itself. That is, the occupant may operate the steering wheel HD to input the request value of the left-right adjustment amount. The steering wheel HD may function as the left-right input unit 11 only while a button provided in the vehicle interior is pressed. The vehicle speed input unit 12 may be an accelerator and a brake of the vehicle. That is, the request value of the vehicle speed adjustment amount may be input by the occupant operating the accelerator and the brake. The accelerator and the brake may function as the vehicle speed input unit 12 only while a button provided in the vehicle compartment is pressed.

In each of the above-described embodiments, when the information acquirer 21 acquires the request value of the vehicle speed adjustment amount such that the vehicle speed exceeds a legal speed, the behavior adjustment unit 22 may adjust the vehicle speed such that the vehicle speed does not exceed the legal speed. In addition, the behavior adjustment unit 22 may adjust the vehicle speed so as not to exceed an arbitrary vehicle speed set in advance without being limited to the legal speed. That is, an upper limit may be set for the vehicle speed adjusted by the behavior adjustment unit 22.

In each of the above embodiments, the display 40 may be omitted. In such the configuration, at least one of the request value of the left-right adjustment amount and the request value of the vehicle speed adjustment amount acquired by the information acquirer 21 may be transmitted to the occupant by voice, for example.

The functional units 21, 22, 23, 24 and methods thereof described in the present disclosure may be implemented by a dedicated computer provided by configuring a processor and a memory programmed to execute one or more functions embodied by a computer program. Alternatively, the functional units 21, 22, 23, 24 and methods thereof described in the present disclosure may be implemented by a dedicated computer provided by configuring the processor with one or more dedicated hardware logic circuits. Alternatively, the functional units 21, 22, 23, 24 and methods thereof described in the present disclosure may be implemented by one or more dedicated computers configured with a combination of a processor and a memory programmed to execute one or more functions, and a processor configured with one or more hardware logic circuits. A computer program may be stored in a computer-readable non-transitory tangible recording medium as an instruction executed by a computer.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, some of the technical features may be omitted as appropriate. In addition, the technology described herein can be implemented in the form of a computer program for executing the above described control method, a storage medium on which this computer program is recorded, and so on.

What is claimed is:

1. A vehicle control system mounted on a vehicle including an automated driving system configured to execute automated driving, comprising:

at least one processor; and at least one memory storing computer program code, wherein the at least one memory and the computer program code are configured, with the at least one processor, to cause the vehicle control system to carry out:

adjusting a behavior of the vehicle during execution of the automated driving, the behavior including at least one of a traveling position in a width direction in a traveling lane, a vehicle speed, or an acceleration;

acquiring behavior request information related to a behavior request for the behavior from an occupant of the vehicle;

receiving a request value of a left-right adjustment amount which is an adjustment amount of the traveling position in the width direction;

receiving a request value of a vehicle speed adjustment amount which is an adjustment amount of at least one of the vehicle speed and the acceleration;

storing, in the memory, the request value of the left-right adjustment amount and the request value of the vehicle speed adjustment amount;

storing, in the memory, map data used for the automated driving by the automated driving system and the request value of the left-right adjustment amount at each point in the map data in association with the map data;

storing, in the memory, the map data and the request value of the vehicle speed adjustment amount at each point in the map data in association with the map data, wherein the acquiring includes:

acquiring, as the behavior request information, at least one of the request value of the left-right adjustment amount or the request value of the vehicle speed adjustment amount stored in the memory; and acquiring, during continuation of the automated driving, the request value of the left-right adjustment amount and the request value of the vehicle speed adjustment amount, which are stored in the memory and associated with a current traveling position, and the adjusting includes:

adjusting the behavior determined by the automated driving system based on the behavior request information;

based on the request value of the left-right adjustment amount acquired by the acquiring, adjusting in real time the traveling position in the width direction while continuing execution of the automated driving; and based on the request value of the vehicle speed adjustment amount acquired by the acquiring, adjusting in real time the vehicle speed while continuing execution of the automated driving.

2. The vehicle control system according to claim 1, wherein, the at least one memory and the computer program code are further configured, with the at least one processor, to cause the vehicle control system to carry out:

determining the occupant of the vehicle; and storing the request value of the left-right adjustment amount in association with the occupant, and the request value of the vehicle speed adjustment amount in association with the occupant, and the acquiring includes acquiring at least one of the request value of the left-right adjustment amount associated with the occupant determined by the determining among request values in the at least one memory and a request value of the vehicle speed adjustment amount associated with the occupant determined by the determining among request values in the at least one memory.

3. The vehicle control system according to claim 2, wherein the at least one memory and the computer program code are further configured, with the at least one processor, to cause the vehicle control system to carry out:

storing, in the memory for each occupant of a plurality of occupants including the occupant, the request value of the left-right adjustment amount and the request value of the vehicle speed adjustment amount, wherein the occupant is determined from among the plurality of occupants, wherein the request value of the left-right adjustment amount and the request value of the vehicle speed adjustment amount utilized by the adjusting correspond to the occupant which is determined and the associated point in the map data.

4. The vehicle control system according to claim 1, wherein the at least one memory and the computer program code are further configured, with the at least one processor, to cause the vehicle control system to carry out:

outputting a reference left-right adjustment amount and a reference vehicle speed adjustment amount, the reference left-right adjustment amount is a reference of the request value of the left-right adjustment amount determined based on a difference between the traveling position in the width direction in manual driving by the occupant and the traveling position in the width direction in the automated driving by the automated driving system, the reference vehicle speed adjustment amount is a reference of the request value of the vehicle speed adjustment amount determined based on a difference between at least one of the vehicle speed and the acceleration in the manual driving and at least one of the vehicle speed and the acceleration in the automated driving, the storing includes storing the reference left-right adjustment amount and the reference vehicle speed adjustment amount, and the acquiring includes acquiring, as the behavior request information, at least one of the reference left-right adjustment amount and the reference vehicle speed adjustment amount stored in the at least one memory.

5. The vehicle control system according to claim 4, wherein the storing includes storing the map data and the reference vehicle speed adjustment amount at each point in the map data in association with each other.

6. The vehicle control system according to claim 5, wherein the reference vehicle speed adjustment amount is an average value of the difference between the at least one of the vehicle speed and the acceleration in the manual driving and at least one of a specified speed and a specified acceleration.

7. The vehicle control system according to claim 1, wherein the at least one memory and the computer program code are further configured, with the at least one processor, to cause the vehicle control system to carry out:

displaying at least one of the request value of the left-right adjustment amount or the request value of the vehicle speed adjustment amount acquired by the acquiring.

8. The vehicle control system according to claim 1, wherein the acquiring of the behavior request information is performed in response to an input received from the occupant during the continuation of the automated driving, and the adjusting of the behavior is performed in response to the acquiring of the behavior request information during the continuation of the automated driving.

9. The vehicle control system according to claim 1, wherein the adjusting the behavior further includes transmitting information to a steering device of the vehicle, a driving device of the vehicle, a braking device of the vehicle, or the automated driving system.

10. The vehicle control system according to claim 1, wherein the adjusting the width direction adjusts the vehicle in the traveling lane.

* * * * *